Dec. 18, 1945.  D. D. BRYANT  2,391,121
DUSTGUARD
Filed Aug. 10, 1944  3 Sheets-Sheet 1
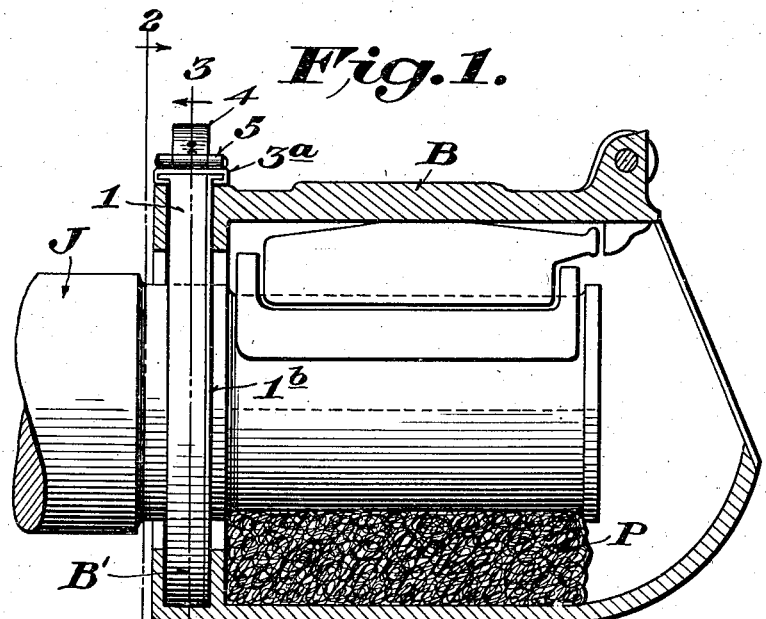
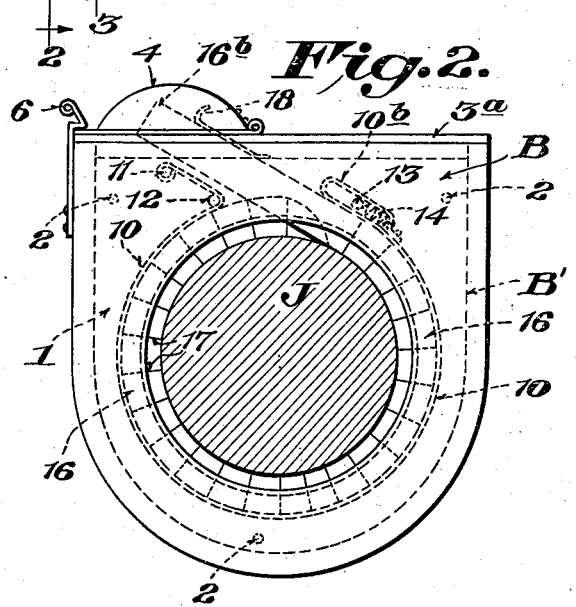
Inventor
Donald D. Bryant
By
Attorneys

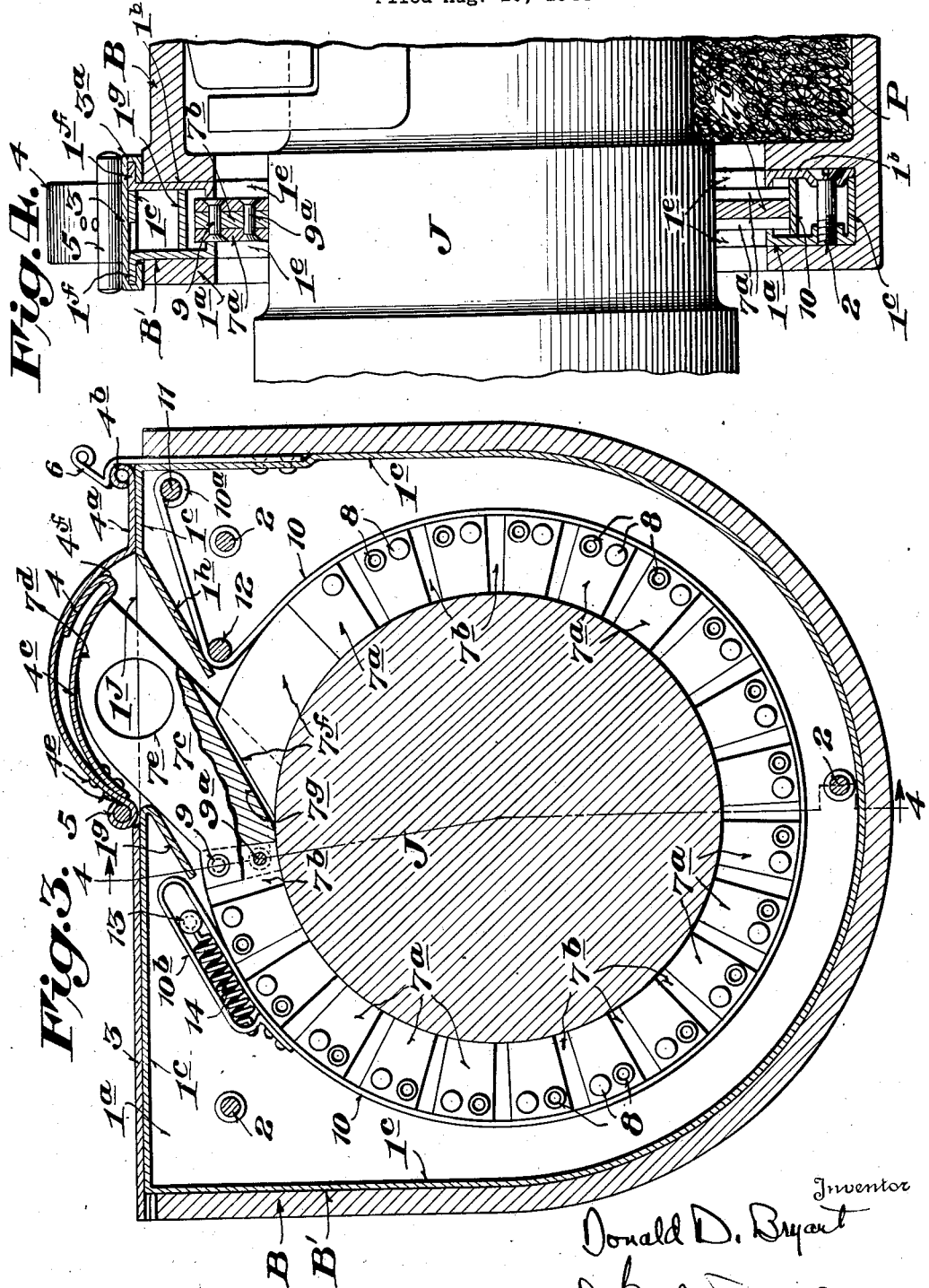

Dec. 18, 1945. D. D. BRYANT 2,391,121
DUSTGUARD
Filed Aug. 10, 1944   3 Sheets-Sheet 3
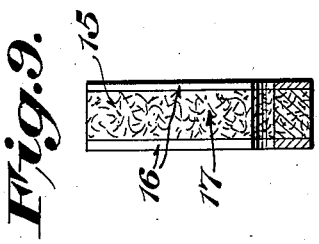
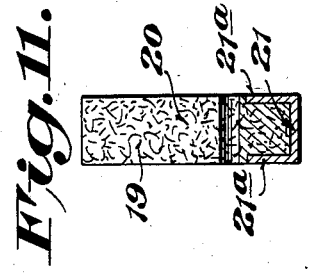
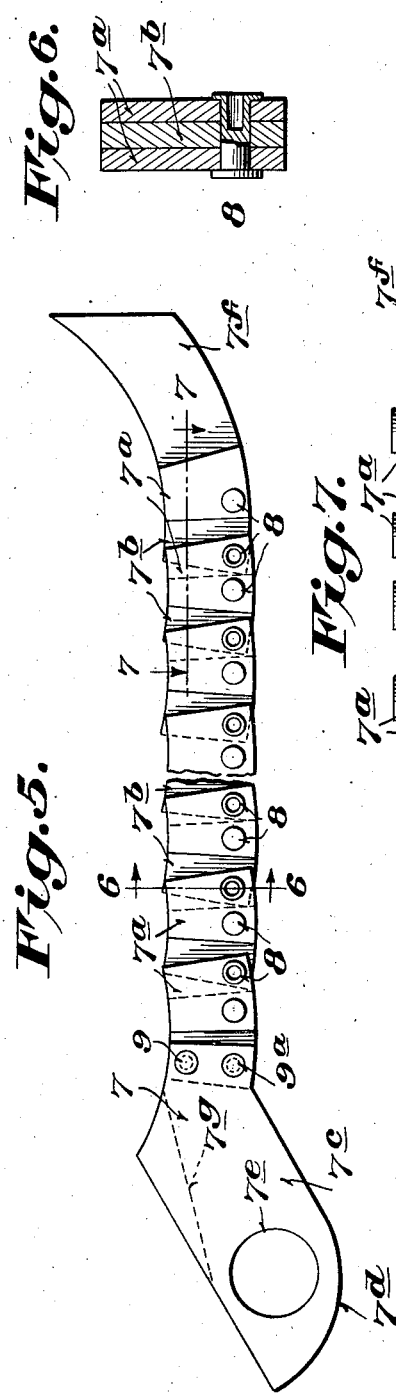
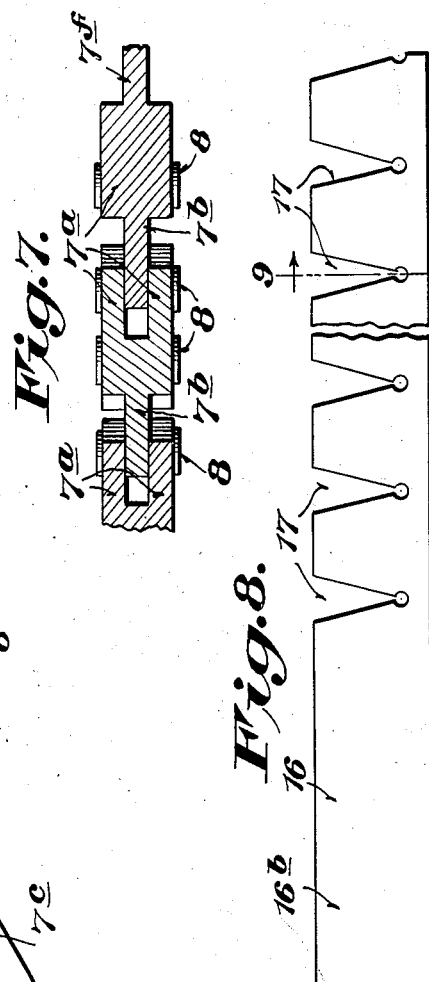
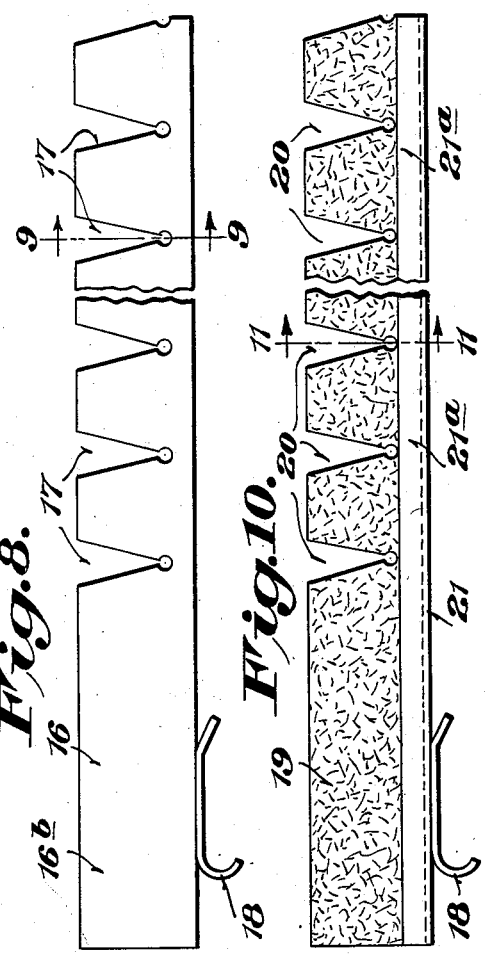
Inventor
Donald D. Bryant
By
Attorneys Patented Dec. 18, 1945

2,391,121

UNITED STATES PATENT OFFICE 2,391,121

DUST GUARD

Donald D. Bryant, Huntington, W. Va.

Application August 10, 1944, Serial No. 548,835

15 Claims. (Cl. 286—6)

This invention is a novel dustguard for journal box housings or the like, particularly adapted for use in freight car, passenger car, and locomotive trucks and tender journals, but may be used in any other desired places.

The axles of freight and passenger cars, as well as locomotive trucks and tenders, are journaled in journal box housings, and it is required by the A. A. R. to provide dustguards in said journal boxes in order to keep dust, dirt, water, moisture and other foreign or abrasive material from entering the end of the journal box housing along or around the axle. Failure to provide such dustguards would leave an opening through which such dust, dirt, grit, etc., picked up by the rapid movement of the train could enter, the same resulting in undue wear or abrasion between movable parts, or scoring of the highly polished or finished surface of the journals, or causing waste or packing thread grabs, or causing rusting or spotting of the burnished journal bearing seats often resulting in hot boxes causing derailment, destruction of equipment, train delays, or loss of human life to train crews as well as the travelling public.

The dustguards now in general use, required by the A. A. R., are held in place in a cavity pocket cast or formed in the journal box housing, and the dustguard is usually formed of rigid plywood or fibre which fits into the cavity pocket, the fibre or plywood sections of the dustguard being riveted or stapled together. The present dustguards are of little or no protection for the purpose for which same are intended, since the same are not contractible so as to fit snugly around the axle, nor are same adjustable for wear. Moreover same, being rigid, are therefore liable to breakage since their rigidity allows no flexibility. Such dustguards cannot be removed without removing the truck from the car and disengaging the entire truck assembly, and therefore the usual dustguards, above described, are damaged or destroyed when the car is jacked-up to remove or renew the journal brass, which brass must be renewed when damaged, worn, or when for any reason a failure therein occurs. The brass is renewable without shopping the car for repair, but the dustguard, which has been so damaged by jacking-up the car to remove the brass, no longer serves as a protection in its broken condition and thus becomes a source of danger or liability.

With respect to the present dustguards, no means are provided for removing or replacing same without shopping the car for heavy duty repair; and thus from a servicing standpoint the present dustguard is impractical, and is inefficient since it does not contain self-adjusting features. Heretofore it has been necessary to scrap the dustguard unit as a whole, no part being interchangeable or salvaged.

Due to the above conditions, a serious need has arisen for some improvement which would give the desired necessary protection, would eliminate the hazard to the axles and their appurtenances, prevent hotboxes, protect equipment, save train delays and derailments and serious injuries to the train crews and the travelling public, and which will save needless expenditures for parts and labor.

The principal object of my invention is to provide a self-adjusting filler rack containing the dustguard band and adapted to fit into the usual cavity pocket cast in the journal box housing, which filler rack cannot be damaged by jacking-up the car to remove the journal brass since it fits within the housing, thus allowing the car to be raised and the brass removed simply by removing the dustguard band from the filler rack, which latter is shielded and protected by the journal box housing and is not subjected to wear, damage, or mechanical injury, and which when once installed, becomes a permanent fixture.

A further object of the invention is to provide a filler rack as above described with a removable dustguard band entered through an opening at the top of the rack and contacting a metallic supporting band whereby same is guided to encircle the journal, the dustguard band being held closely in place around the journal by the supporting band which is resiliently mounted in the rack to compensate for wear of the dustguard band, and the supporting band providing good protection for the dustguard band as no gritty or other particles can pass therethrough.

A further object of the invention is to provide an insert band of the above type which may be removed at any time without the use of tools, its ready accessibility making it convenient for removal at any place or time by merely pulling same out of the rack and replacing it again, its entire removal and replacement requiring only a few minutes time to complete.

Other minor objects of the invention will be hereinafter set forth.

I will explain the invention with reference to the accompanying drawings, which illustrate several practical embodiments thereof, to enable others familiar with the art to adopt and use the same; and will summarize in the claims, the novel features of construction, and novel combinations of parts, for which protection is desired.

In said drawings:

Fig. 1 is a longitudinal section through a journal box housing equipped with my improved dustguard filler rack inserted in the usual cavity pocket cast at the inner end of the housing.

Fig. 2 is a transverse section on the line 2—2, Fig. 1.

Fig. 3 is an enlarged transverse section on the line 3—3, Fig. 1.

Fig. 4 is a section on the line 4—4, Fig. 3.

Fig. 5 is a plan view of one form of dustguard band, detached.

Fig. 6 is an enlarged section on the line 6—6, Fig. 5.

Fig. 7 is an enlarged section on the line 7—7, Fig. 5.

Fig. 8 is a plan view of a modified dustguard band, detached.

Fig. 9 is an enlarged section on the line 9—9, Fig. 8.

Fig. 10 is a plan view of a further modified dustguard band, detached.

Fig. 11 is an enlarged section on the line 11—11, Fig. 10.

As shown, the journal J of the car truck or other equipment is entered in the normal manner into the journal box B of usual construction, the same containing the packing P saturated with lubricant in the usual manner, the particular form of the journal box forming no part of my present invention. Such journal boxes B are customarily provided at their inner ends with a dustguard cavity pocket B' for the reception of the usual dustguard hereinbefore referred to, same being of rigid construction, formed of layers of plywood or fibre riveted or stapled together.

In place of the usual dustguard, above mentioned, I provide a filler rack of such size and dimensions as to fit within the cavity B' which is ordinarily open at the top of box B, said rack being designated generally by the reference character 1 and making a snug fit within the cavity, as shown more particularly in Figs. 1 to 3.

The filler rack preferably comprises a box-like structure preferably formed of spaced metal plates 1a, 1b, Fig. 4, of size conforming with that of cavity B', one of the plates such as 1a having a peripheral flange 1c, Fig. 4, and the plates being held together by means of countersunk screws 2 at desired spaced intervals to form a rigid shell. Said plates 1a, 1b are provided with journal receiving circular bores 1e of diameter larger than the journal J. The upper edges of plates 1a, 1b are outturned as at 1f, said outturned portions overlying the top of box B, and a closure plate 3 having guide slots 3a at its side edges is slipped over the outturned flanges 1f so as to form a removable top for the filler rack 1 which will exclude dirt and dust from entering between the plates 1a, 1b.

The flange 1c at the top of the filler rack 1 is severed at one side of the vertical axis of the journal to form an opening 1j in the top of the rack 1, and the adjacent portion of the flange 1c is bent as at 1g inwardly and downwardly at an acute angle substantially tangent to the journal J to form one end wall of the opening 1j, while at the other end of opening 1j the flange 1c is deflected downwardly and inwardly as at 1h at an obtuse angle (Fig. 3) in a plane substantially parallel to that of the wall 1g to form the other end wall of the opening 1j, so that the dustguard band inserted in the opening 1j will be directed by walls 1g, 1h, substantially tangentially of the journal J. The cover plate 3 terminates adjacent the band of the flange 1g, as shown in Fig. 3, and a hinged cover portion 4 is secured thereto by means of hinge 5, said cover 4 being bowed or arched upwardly as shown over the opening 1j between the walls 1g, 1h, the cover plate 4 being extended as at 4a to the side of the rack 1, said end of cover 4a being rolled as at 4b to engage a spring clasp 6, Fig. 3, secured by screws or the like to the outside of the journal box or to the side of the rack 1, whereby when the clasp 6 is deflected away from the hinge 5 the cover plate 4 may be swung upwardly for the purpose of removing or inserting the dustguard band hereinafter described, the clasp 6 normally maintaining the cover plate 4 closed to prevent dust, grit, debris, etc., from entering rack 1.

On the inside of the arched portion of cover 4 is a resilient strip 4c secured as at 4e to the underside of the cover adjacent hinge 5, the strip 4c having substantially the same curvature as the arched portion of the cover, and having a return flange 4f at its outer end normally contacting the underside of the cover 4 and adapted to yield downward pressure on the handle 7c of the dustguard band 7 hereinafter described.

Figs. 3 to 7 inclusive illustrate one form of dustguard band denoted generally by the numeral 7, same being articulated and consisting, for the major portion of its length, of wooden sections hinged together in a manner similar to links of a chain, each section consisting of pairs of parallel plate members 7a which are riveted together along their outer edges by pairs of rivets 8, said plates 7a being substantially in the shape of truncated triangles, and said plates 7a being separated by means of separator plates 7b of similar shape hingedly projecting from one side of the pair of plates 7a, the projecting portions of the separator plates 7b forming tongues adapted to enter the grooves between the pair of plates 7a of an adjacent section, said separator plates being also pivotally connected to the related pair of plates 7a of the section by the rivets 8. The edges of the separators 7b and plates 7a are such that when the dustguard is positioned around the journal J as in Fig. 3, after being inserted through the opening 1j in rack 1, the side edges of the plates and separators of the sections will be disposed substantially radial with respect to the axis of journal J. The section plates 7a and 7b are constructed of wood, preferably hardwood maple; and due to the tongue and groove action of the section, in which the tongues and grooves interlock, when the dustguard is inserted in the opening 1j in rack 1, as shown in Fig. 3, the band 7 becomes in effect a solid dustguard around journal J.

At one end of the band 7 is a handle 7c rigidly secured to the adjacent separator plate 7b by means of rivets 9 and 10 so as to be relatively immovable with respect thereto, said handle being shaped to fit between the walls 1g, 1h, of opening 1j and having a rounded outer edge 7d engaging the yieldable strip 4c on the underside of cover 4, whereby the handle 7c is yieldably urged downwardly into the filler rack 1 when the cover is closed, as indicated in Fig. 3. Preferably the handle 7c is provided with a finger opening 7e therein whereby when the cover 4 is raised the repairman may insert his finger through hole 1e and pull the entire band 7 out through the opening 1j between the walls 1g, 1h. At the opposite end of the dustguard band 7 is a tip member 7f secured to the plates 7a of the adjacent section and being of such length as to lie closely adjacent to the inclined lower edge 7g (Fig. 3) of handle 7c, so as to substantially close the gap between the ends of band 7 when inserted in place in rack 1, as shown in Fig. 3. The opening 1j in the top of rack 1 is closed when the dustguard band 7 is inserted into the rack 1, the rigid handle 7c of the band acting as a cover, lock, and removable pull. The inner edges of each of the plates 7a, 7b and 7f are arcuate to conform with the curvature of journal J.

In order to maintain band 7 in close contact with the periphery of journal J, a metallic band 10 is provided having one end 10a hooked over a post 11, Fig. 3, in rear of wall 1h, the band 10 passing over a post 12 disposed adjacent the lower end of the wall 1h from when the band 10 passes around the outer periphery of the band 7 to a point adjacent the lower end of the wall 1g, the band being looped as at 10b adjacent the wall 1g, and a fixed post 13 is disposed within the loop 10b between the ends thereof. A spring 14 is also disposed in the loop 10b between post 13 and the inner end of the loop, said spring having its ends secured to the loop and post 13 in such manner as to yieldably contract the band 10 around the periphery of the dustguard 7 and thereby hold each of the sections of the dustguard in close contact with journal J.

When the dustguard band 7 is entered into the filler rack 1, the leading end contacts the metallic band 10 which guides the dustguard around the journal J and holds same in place. Moreover, the band 10 will adjust itself around the dustguard and will serve as a protector for the dustguard 7. Preferably the metal band 10 is of slightly less width than the spacing between the walls 1a, 1b, so that the edges of the band do not quite touch the sides of the rack, as such touching action would retard the adjusting action of band 10. The metal band 10 cannot leave the filler rack when the dustguard 7 is withdrawn, since the walls of the openings 1e for the journal J in the plates 1a, 1b are slightly inturned, as shown in Fig. 4. Thus when the dustguard 7 is removed from the filler rack 1 the band 10 cannot be removed therefrom, and all danger of injury to the band 10 is eliminated, the free action of the band 10 allowing the dustguard 7 to move freely at all times within the rack 1 without leaving its protecting dustguard position around the journal J; and the dustguard band 7 remains tight at all times regardless of the rough handling of the car.

Instead of utilizing the articulated dustguard 7, shown in Figs. 3 to 7, a simpler construction of the band may be used as shown in Figs. 8 and 9, the same consisting of a strip of pressed felt 15 (Fig. 9) covered on opposite sides with strips of leather 16, the same having a series of V-shaped notches 17 therein extending across the major portion of the width of the strip, said notches 17 permitting the strip to conform with the curvature of journal J when inserted through opening 1j in filler rack 1 in the same manner previously described in connection with band 7. The handle portion 16b of this dustguard is unnotched, and a hand pull 18 is secured to the outer edge thereof so that the strip may be readily inserted in and removed from the filler rack. This type of band must be oil-soaked before inserting or using.

In Figs. 10 and 11 a further modification of dustguard band is disclosed, same being similar to the construction shown in Figs. 8 and 9, except that the same preferably comprises a solid felt strip 19 having a series of V-shaped notches 20 formed therein similar to the notches 17. In this modification a metallic strip 21 is applied to the outer face or back of the felt strip 19, said metal strip having flanges 21a extending a slight distance up the sides of the felt 19 for the purpose of stiffening the felt. In this modification the felt strip 19 must also be oil-soaked before using or inserting.

The filler rack 1 may be built of metal sheets of desired thickness; or same may be built entirely of wood, such as hard maple plywood with the side plates fastened to a peripheral spacer by means of waterproof glue.

In all said modifications the dustguard band may be removed at any time without tools. Its ready accessibility makes it convenient for removal at any place or time by simply pulling out the band and replacing it again, its entire removal and replacement taking only a few minutes of time.

I do not limit my invention to the exact forms shown in the drawings, for obviously changes may be made therein within the scope of the claims; and the rack 1 may, if desired, form a permanent instead of removable element of the journal box housing while permitting the dustguard bands to be removed or replaced.

I claim:

1. A seal for a journal box having a cavity pocket provided with a bore for a journal; said pocket having an opening therein; a closure for said opening; a freely swingable band yieldably mounted within the pocket around and spaced from the journal and having its ends secured adjacent the opening; and a flexible dustguard band within the pocket encircling the entire periphery of the journal and interposed between the journal and swingable band, said dustguard band being insertable in and removable from the pocket by endwise movement through said opening, the trailing end of the dustguard band projecting through said opening below the closure to form a handle.

2. In a combination as set forth in claim 1, yieldable means on the underside of said closure engaging the trailing end of the dustguard band to maintain the dustguard band encircled around the journal; the yieldable band maintaining the dustguard band contracted around the journal.

3. In a combination as set forth in claim 1, said dustguard band comprising articulated wooden sections interlocking in tongue and groove relation pivotally connected together and adapted when encircling the journal to make an unbroken contact therewith throughout its length.

4. In a combination as set forth in claim 1, said dustguard band comprising a fibrous oil-soaked strip having strips of oil-soaked leather secured to opposite sides thereof, and having a series of V-shaped notches extending inwardly from one edge thereof, the trailing end being unnotched and extending through said opening and engaging the underside of said closure.

5. In a combination as set forth in claim 1, said dustguard band comprising an oil-soaked strip of felt having a series of V-shaped notches extending inwardly from one edge thereof, the trailing end thereof being unnotched; and a strip of metal secured to the side of the felt opposite from said notches, said metal strip having narrow side flanges engaging the sides of the felt strip to stiffen same.

6. A seal for a journal box having a cavity pocket; a filler rack removably positioned in a pocket and having a bore therethrough for said journal; said rack having an opening therein; a closure for said opening; a freely swingable band yieldably mounted within the rack around and spaced from the journal and having its ends secured adjacent the opening; and a flexible dustguard band within the rack encircling the entire periphery of the journal and interposed between the journal and swingable band, said dustguard band being insertable in and removable from the rack by endwise movement through said opening, the trailing end of the dustguard band projecting through said opening below the closure to form a handle.

7. In a combination as set forth in claim 6, yieldable means within the closure on the underside thereof engaging the trailing end of the dustguard band to maintain the dustguard band encircled around the journal; the yieldable band maintaining the dustguard band contracted around the journal.

8. In a combination as set forth in claim 6, said closure being hinged to said rack and being arched over said opening; means for maintaining said closure in closing position; and yieldable means within the arched portion of the closure engaging the trailing end of the dustguard band to maintain the dustguard band encircled around the journal; the yieldable band maintaining the dustguard band contracted around the journal.

9. In a combination as set forth in claim 6, said dustguard band comprising articulated wooden sections interlocking in tongue and groove relation pivotally connected together and adapted when encircling the journal to make an unbroken contact therewith throughout its length.

10. In a combination as set forth in claim 6, said dustguard band comprising a fibrous oil-soaked strip having side strips of oil-soaked leather secured to opposite sides thereof and having a series of V-shaped notches extending inwardly from one edge thereof, the trailing end being unnotched and engaging the underside of said closure.

11. In a combination as set forth in claim 6, said dustguard band comprising an oil-soaked strip of felt having a series of V-shaped notches extending inwardly from one edge thereof, the trailing end thereof being unnotched; and a strip of metal secured to the side of the felt opposite from said notches, said metal strip having narrow side flanges engaging the sides of the felt strip to stiffen same.

12. A seal for a journal box having a cavity pocket; a filler rack removably positioned in said pocket and having a bore therethrough through which a journal extends; said rack having an opening in its top offset from the axis of the journal; a closure for said opening; a freely swingable band yieldably mounted within the rack around and spaced from the journal and having its ends secured adjacent the opening; a flexible dustguard band within the rack encircling the entire periphery of the journal and interposed between the journal and swingable band, said dustguard band being insertable in and removable from the rack by endwise movement through said opening, and the trailing end thereof when positioned extending through said opening to form a handle engaging the said closure; said closure being hinged to said rack and being arched over said opening; means for maintaining said closure in closing position; and yieldable means within the arched portion of the closure engaging the trailing end of the dustguard band to maintain the dustguard band encircled around the journal; the yieldable band maintaining the dustguard band contracted around the journal.

13. A dustguard band comprising articulated wooden sections interlocking in tongue and groove relation pivotally connected together, and a rigid handle on one end of the sections; said handle having a finger engaging hole therein.

14. A dustguard band comprising a felt strip having side strips of leather secured thereto and having a series of V-shaped notches extending inwardly from one edge thereof, one end being unnotched; and a finger engaging clip on said unnotched end; said felt and leather strips being oil-soaked.

15. A dustguard band comprising an oil-soaked strip of felt having a series of V-shaped notches extending inwardly from one edge thereof, one end thereof being unnotched; a strip of metal secured to the side of the felt opposite from said notches, said metal strip having narrow side flanges engaging the sides of the felt strip to stiffen same; and a finger engaging clip on said metal strip adjacent the unnotched end.

DONALD D. BRYANT.